Feb. 28, 1950     G. M. BECKWITH     2,498,641
ASTRONOMICAL DEVICE

Filed May 1, 1946     3 Sheets-Sheet 1

INVENTOR.
GEORGE M. BECKWITH
BY
*M. O. Hayes*
ATTORNEY

Feb. 28, 1950        G. M. BECKWITH        2,498,641
ASTRONOMICAL DEVICE

Filed May 1, 1946                                         3 Sheets-Sheet 2

INVENTOR.
GEORGE M. BECKWITH
BY M. A. Hayes
ATTORNEY

Feb. 28, 1950     G. M. BECKWITH     2,498,641
ASTRONOMICAL DEVICE

Filed May 1, 1946     3 Sheets-Sheet 3

INVENTOR.
GEORGE M. BECKWITH
BY M. A. Hayes
ATTORNEY

Patented Feb. 28, 1950

2,498,641

UNITED STATES PATENT OFFICE 2,498,641

ASTRONOMICAL DEVICE

George Malcolm Beckwith, United States Navy

Application May 1, 1946, Serial No. 666,224

8 Claims. (Cl. 35—43)

(Granted under the act of March 3, 1883, as amended April 30, 1928; 370 O. G. 757)

This invention relates to an astronomical device and more particularly to a device adapted for illustrating or teaching celestial navigation and the related fundamentals of astronomy.

An object of the present invention is to provide means for improving visual presentations of the principles of celestial navigation.

Another object is to expedite the training period of trainees in celestial navigation by simplifying, using three dimensional representation, the mathematical concepts and definitions of space, time and geometrical relationships inherent in the study of celestial navigation.

A further object is to provide a device having the aforementioned advantages yet being portable and adapted to be assembled and mounted readily for purposes of demonstration.

Still another object is to provide a teaching aid in celestial navigation that is pleasing to the eye, easy to manipulate, and capable of physical representation of the concepts of celestial navigation necessary for the solution of problems in navigation.

Further objects and advantages of this invention, as well as its construction, arrangement and operation, will be apparent from the following description and claims in connection with the accompanying drawings, in which:

Figure 1:
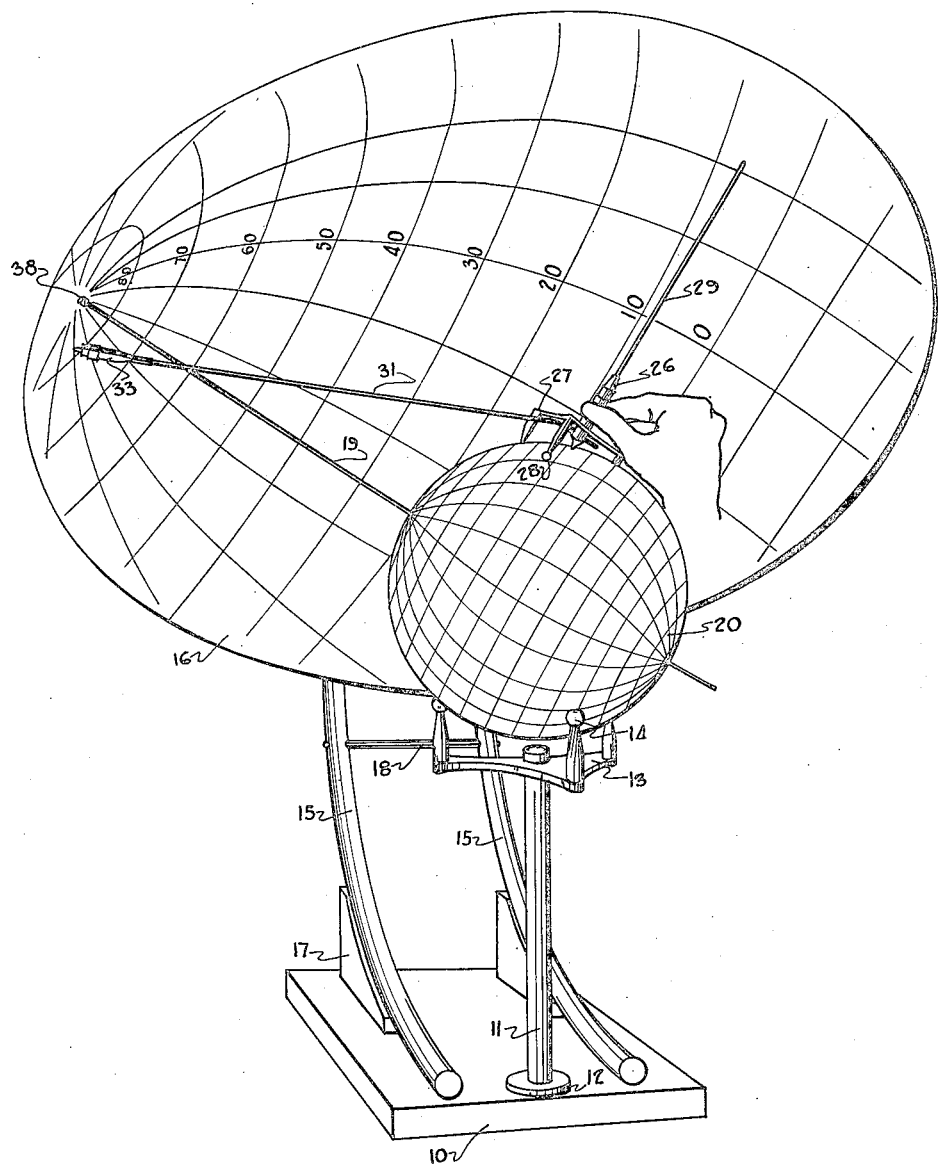
Fig. 1 is a perspective view of a preferred embodiment of the invention.
Figure 3:
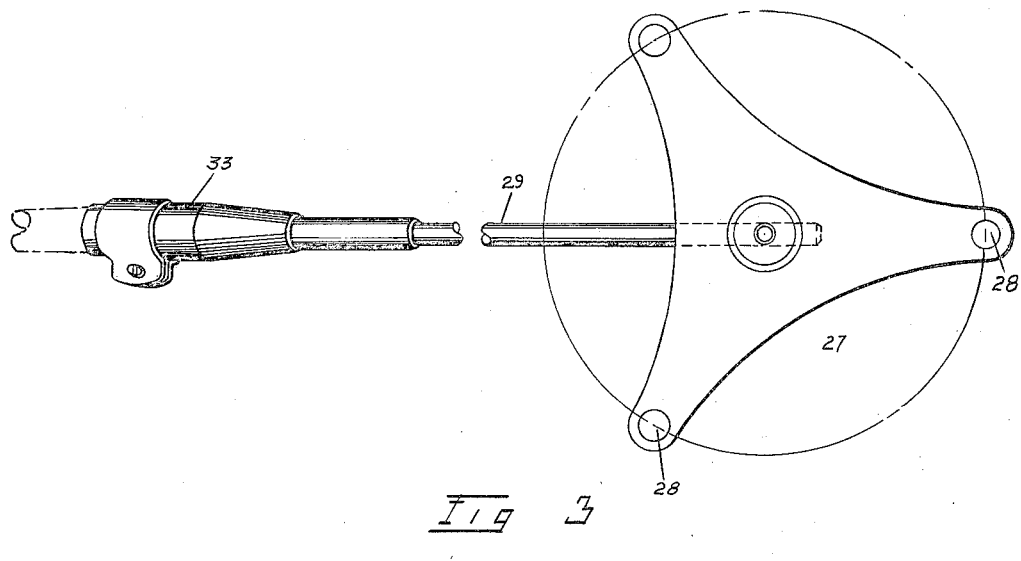
Fig. 3 is a plan view of Figure 2.
Figure 2:
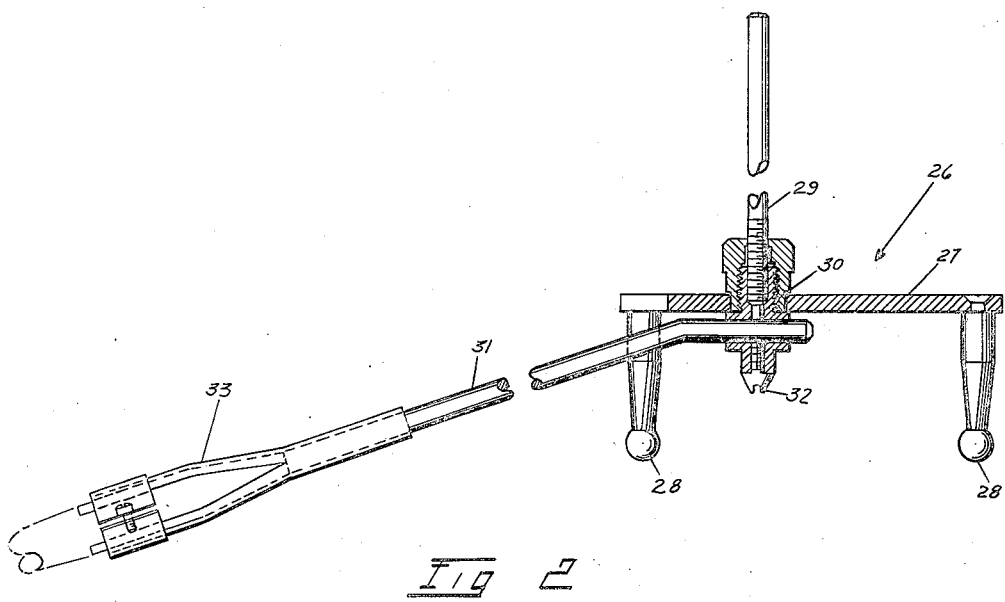
Fig. 2 is an elevation view, partly sectionalized, of the mechanical projector that forms part of the present invention.
Figure 4:
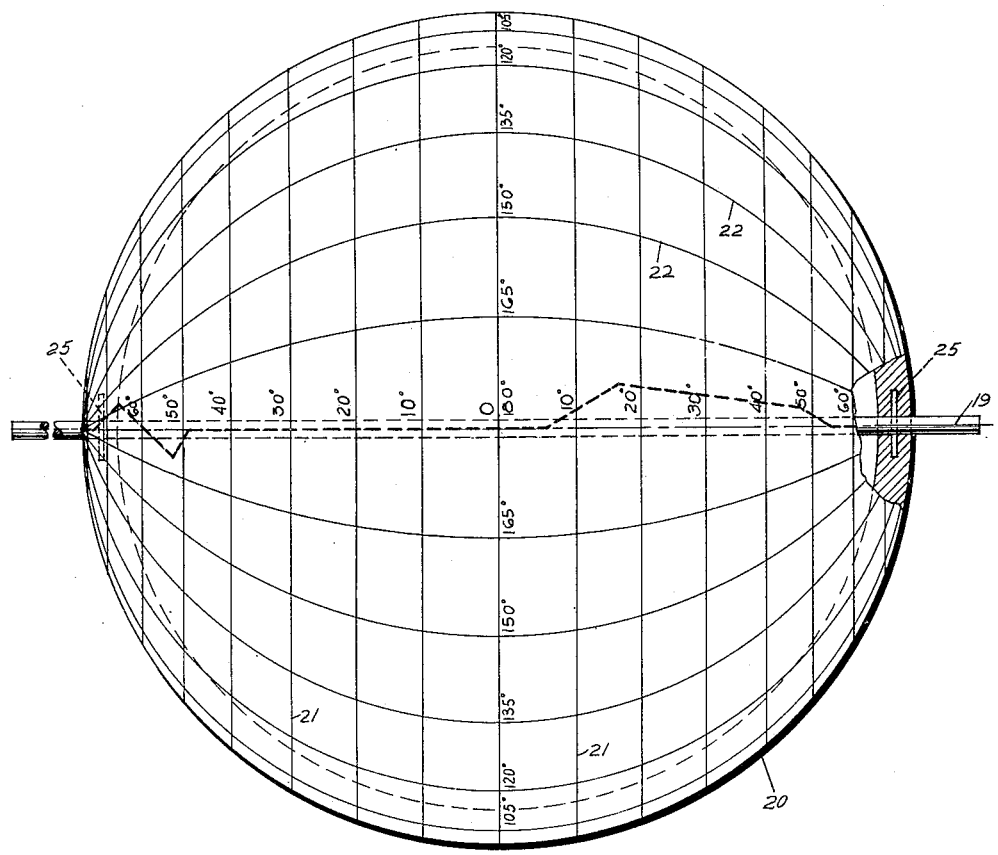
Fig. 4 is a detailed view of the sphere shown in Fig. 1.

A base plate 10 of plywood, or other suitable light material, carries a rod 11 set in a bushing 12 that lies midway and forward of the base plate 10. Atop of the rod 12 is a horizontal tripod stand 13, the spheroids 14 of the tripod being 120° apart and preferably made of hard rubber or synthetic resin. A pair of curved braces 15 rise rearwardly of the base 10 to support a section of the celestial hemisphere 16. In the present embodiment of the invention, a 200° section is considered an ample portion of the sky, sufficient to demonstrate the solution of problems in celestial navigation, although different section angles of the sky can be cut, and the cuts may be cut for either hemisphere. Blocks 17 and crosspiece 18 serve to buttress the braces 15 and prevent their distortion, since the latter support the entire hemisphere section 16.

The pole (either north or south) of the celestial hemisphere is a stud pin 38 that engages the rod 19, the latter being the axis of the earth or globe 20, as well as the axis of the celestial sphere 16, only a portion of which is shown. The celestial dome 16 and terrestrial globe 20 are preferably made of fibre reinforced with plaster of Paris. The peripheries of the continents and principal islands of the earth are etched about $\frac{1}{32}''$ into the plaster surface and are then filled with a light gray paint. The entire sphere 20 is painted with blackboard paint, while the latitude and longitude lines are incised about $\frac{1}{32}''$ into the sphere 20 and are filled with light gray paint. For purposes of visual clarity, the 0° (prime meridian) can be painted a bright color, such as red, and the international date line can be painted as a dotted red and white line, or as any other color so that it can be distinguished readily from the other lines on the globe 20.

The celestial dome 16 can be made of the same material as the globe 20, or it can be made of a suitable plastic material painted black and bearing etched latitude and longitude arcs. The dome 16 and sphere 20 should be able to take on and retain chalk marks without blurring. The circles of latitude 21 and longitude 22 on the globe and the circles or arcs of latitude 23 and longitude 24 on the dome 16 are preferably spaced off every 10° for latitude and every 15° for longitude. The fineness of spacing is optional and is determined by the size of the models used, the accuracy of plotting desired, etc. The rod 19 is fixed to the plaster sphere by pins 25 so that the sphere 20 cannot rotate relative to the rod.

The celestial projector 26 comprises a tripod stand 27 whose equally spaced studs 28 are adapted to be placed on any portion of the sphere 20 so that all studs 28 rest upon the sphere's surface. The rod 29 of the projector is held upright by a stud bearing 30, and an offset arm 31 rides in the bearing 30, the setscrew 32, when tightened, preventing the rotary swinging of the arm 31. A chalk holder 33 makes a loose fit with the tip of the swingable arm 31.

The ability to establish a line of position by observation of a celestial body is based on the fundamental fact that for any given instant of time, the altitude and azimuth of a celestial body in relation to the horizon of any assumed position of latitude and longitude can be calculated by solution of the astronomical triangle, using formulas and table made available to the mariner or aviator by the astronomer. This is the basis of all celestial navigation.

The solution of a typical problem in celestial navigation will be described so as to assist in the utilization of the invention as well as to suggest its universal application as a teaching aid in astronomy and celestial navigation. It is to be understood that all selections are arbitrary and have been made merely to demonstrate the general principles involved in the solution of celestial navigation problems.

The navigator by dead reckoning or other method assumes his terrestial position to be longitude 50° W., latitude 25° N., the AP (assumed position) being taken at a definite time for a unique day, say 2000 GCT, April 9, 1945. By reference to right ascension and declination values set forth in the tables of the Nautical Almanac, the stars Dubhe 40 and Denebola 41 are selected. The tables give the right ascension values and declination value for well known and easily identifiable astronomical bodies for that unique time selected. These two values for any astronomical body, right ascension and declination, determine the position of that body in the celestial sphere. Dubhe and Denebola are then plotted, Dubhe having a right ascension of 11 hours 0 minutes east of the first point of Aries, and a declination of 62° 3' N. Denebola is likewise plotted on the celestial sphere 16. The assumed position 43 is plotted on the terrestial sphere 20.

The earth 20 is secured to the celestial sphere 16 through the rod 19 in such a manner that the earth 20 maintains its axis of rotation inclined properly to the equinoctial of the celestial sphere 16. Since the earth 20 maintains a definite relative position in rotation with respect to the celestial sphere 16 for each successive instant of time, the earth must be positioned in rotation according to the time used in this problem, namely, 2000 GCT, April 9, 1945.

Figure 5:
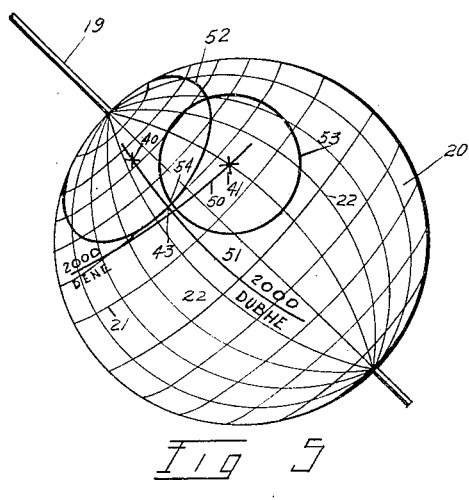
Fig. 5 is a view of said sphere being used to solve a particular problem in navigation.

In the case of Denebola 41, the Greenwich hour angle (GHA) or "earth time" of the star Denebola 41 at 2000 GCT, April 9, 1945, is 55° 22' W. of the Greenwich meridian on the earth. The celestial projector 26 is placed on the earth 20 so that the spaced studs 28 rest on the earth while the rod 29 rises up to contact the celestial sphere 16. The earth 20 is rotated until the top of the rod 29 is under the star Denebola 41, causing the base of the set screw 32 to point to that spot on the earth 20 that is on the Greenwich hour angle of Denebola. Denebola 41 of the celestial sphere 16 is thus projected onto the earth; in other words, the geographic projection (GP) of Denebola falls on Greenwich hour angle (GHA) of Denebola. Similarly, the GHA of Dubhe is obtained from the tables and the terrestial sphere 20 is rotated so that the GP of Dubhe is projected, using the projector 26 so that it lies on the GHA of Dubhe. Two lines of position are formed, one passing through the GP of Dubhe and the assumed position and the other passing through the GP of Denebola and the AP, shown in Fig. 5 as arcs 50 and 51. These lines 50 and 51 are lines of position. By consulting suitable astronomical tables, the actual altitude of each star is attained. The actual altitude computed from the tables for each star will require that the AP be moved on its line of position (LOP) toward or away from the GP of the star, depending upon whether the actual altitude is more or less than for the AP. With this new position obtained on the LOP of, for example, Dubhe, a circle of equal altitude 52 is drawn on the terrestrial globe 20. This circle is obtained by placing chalk or other marking means at one end of a string that is drawn taut; the chalked end is touching the new position of the AP lying on Dubhe's LOP and with the other end of the taut string being held against the celestial position of Dubhe, a circle is scribed onto the globe 20. Similarly, a circle of equal altitude 53 is drawn for the star Denebola. The intersection 54 of the two circles 52 and 53 closest to the assumed position is the required fix desired by the navigator.

The swingable arm 31 used in drawing the celestial horizon is not set at right angles to the rod 29 but is offset slightly to account for parallax. The amount of offset can be determined and will vary with the relative sizes and distance from each other of the celestial sphere 16 and terrestial sphere 20.

With the aid of flexible plastic guides and compasses, celestial triangles can be plotted and projected onto the surface of the earth. Other concepts and definitions such as sensible horizon, vertical circle, sidereal hour angle, relativity, etc., lend themselves to easy study and "pictorial" representation.

It should be clear to one skilled in celestial navigation and particularly to one who is called upon to teach the fundamental concepts of celestial navigation that the present apparatus described and shown herein is capable of portraying visually, by three dimensional means, all the necessary definitions and relationships, terrestrial and celestial, that must be grasped by a novice prior to the solution and understanding of celestial navigation problems.

Moreover, the rod 19 can be removed from its mooring at the pole of the celestial sector 16 so that the globe 20 with the graphical solution of a problem or graphical showing of navigational data drawn thereon can be passed around to students.

Various modifications and changes can be made in this device without departing from the scope of the invention.

The invention described herein may be manufactured and used by or for the Government of the United States of America for governmental purposes without the payment of any royalties thereon or therefor.

I claim:

1. An astronomical device comprising a sector representing a portion of the celestial sphere, a globe representing the earth, means for positioning the globe concentric with the celestial sphere, means for maintaining said globe rotatable with respect to the celestial sphere, the celestial sphere and terrestrial globe being composed of material whose surfaces are capable of receiving and retaining erasable markings, and a pair of pointers adapted to ride on the surface of the earth, one pointer being adapted to project astronomical points of the celestial sphere onto the earth and the other pointer being adapted to make intelligible markings on said celestial sphere.

2. An astronomical device comprising a sector representing a portion of the celestial sphere, an indelible curvilinear coordinate system on the inner surface of the celestial sphere, a globe representing the terrestrial sphere and having on its outer surface an indelible curvilinear coordinate system, a rod engaged fixedly to said globe and extending outwardly therefrom at the poles of the globe, one extremity of the rod being connected rotatably to the celestial pole of the celestial sphere, a supporting stand for said celestial sphere, and a tripod rising from said supporting stand and supporting the globe in a manner to permit rotation of the globe about the rod axis.

3. An astronomical device comprising a platform, a sector representation of the celestial sphere offset from the platform, a simulated terrestrial sphere secured rotatably and detachably to the platform so as to be disposed in space concentric with the sector of the celestial sphere, said sphere and sector having surfaces capable of receiving and retaining erasable markings, an unattached pointer adapted to ride on the surface of the terrestrial sphere and project points from the earth to the celestial sphere or vice versa, and a second pointer offset substantially 90° from the first pointer, said second pointer adapted to make intelligible markings on said celestial sphere.

4. An astronomical device comprising a platform, a sector representing a portion of the celestial sphere secured to and offset from the platform, an upright arm rising from the stand, a horizontally disposed tripod engaged to the top of the upright arm, a terrestrial sphere having longitude and latitude lines impressed thereon resting on the legs of said tripod, connecting means between the celestial sphere and terrestrial sphere for aligning the terrestrial sphere so that its axis is unidirectionally inclined during the rotation of the terrestrial sphere, a second unattached tripod adapted to rest on the surface of the terrestrial sphere, an upright pointer perpendicular to the plane of the unattached tripod and extending sufficiently beyond this plane so that the extremities of the pointer simultaneously touch a point on the celestial sphere and a point on the terrestrial sphere lying on a radius of said spheres.

5. An astronomical device comprising a stand, a sector representing a portion of the celestial sphere rising up from and secured to the stand, an indelible curvilinear coordinate system impressed on the inner surface of the celestial sphere, said surface being capable of receiving and retaining erasable markings, a support arising midway of said stand, a horizontally disposed tripod at the upper extremity of the support, a globe representing the terrestrial sphere and having on its outer surface an indelible and curvilinear coordinate system resting on the legs of said tripod, the surface of said globe being capable of receiving and retaining erasable markings, a rod engaged fixedly to the globe and extending outwardly therefrom at the poles of the globe, an extremity of the rod being connected rotatably to the celestial pole of the celestial sphere.

6. An astronomical device comprising a platform, a sector representation of the celestial sphere secured to and offset from the platform, a simulated terrestrial sphere secured rotatably and detachably to said platform so as to be disposed in space concentric with the sector of the celestial sphere, an unattached tripod adapted to ride on the surface of the simulated terrestrial sphere, an upright pointer perpendicular to the plane of the unattached tripod and extending sufficiently beyond this plane so that the upper extremity of the pointer touches a desired point in the celestial sphere while the lower extremity of the pointer touches a point on the terrestrial sphere, said points lying on a radius of said spheres, and a second pointer offset slightly greater than 90° from the first pointer, said second pointer being adapted to make intelligible markings on said celestial sphere.

7. A device for training in astronomy comprising a platform, a representation of a sector of the celestial sphere secured to and offset from said platform, a simulated terrestrial sphere secured rotatably and detachably to said celestial sphere and resting on said platform so as to be disposed in space concentric with the sector of said celestial sphere, an unattached tripod adapted to ride on the surface of said terrestrial sphere, said tripod carrying a pointer extending to close proximity with said celestial sphere and said terrestrial sphere, said pointer defining both a radius of said celestial sphere and an extension of a radius of said terrestrial sphere, and a second pointer offset 90° plus a parallax factor from said first pointer, said second pointer being rotatable and being adapted to mark a horizon on said celestial sphere.

8. A device for training in astronomy comprising a platform, a representation of a sector of the celestial sphere secured to and offset from said platform, a simulated terrestrial sphere secured rotatably and detachably to the celestial pole of said celestial sphere and resting on said platform so as to be disposed in space concentric with the sector of said celestial sphere, an unattached tripod adapted to ride on the surface of said terrestrial sphere, said tripod carrying a pointer extending to close proximity with said celestial sphere and said terrestrial sphere, said pointer defining both a radius of said celestial sphere and an extension of a radius of said terrestrial sphere, and a second pointer offset 90° plus a parallax factor from said first pointer, said second pointer being rotatable and being adapted to mark a horizon on said celestial sphere.

GEORGE MALCOLM BECKWITH.

REFERENCES CITED

The following references are of record in the file of this patent:

UNITED STATES PATENTS

| Number | Name | Date |
|---|---|---|
| 379,914 | Story | Mar. 20, 1888 |
| 501,136 | Gregory | July 11, 1893 |
| 1,831,390 | Lindelov | Nov. 10, 1931 |
| 2,055,148 | Hagner | Sept. 22, 1936 |
| 2,318,961 | Park | May 11, 1943 |
| 2,399,365 | Link | Apr. 30, 1946 |